(12) United States Patent
Kim et al.

(10) Patent No.: US 10,774,714 B2
(45) Date of Patent: Sep. 15, 2020

(54) NANOFIBER VENT DEVICE FOR UREA WATER TANK AND METHOD FOR MANUFACTURING SAME

(71) Applicant: AMOGREENTECH CO., LTD., Gimpo-si (KR)

(72) Inventors: Chan Kim, Gwangju (KR); Seung Hoon Lee, Paju-si (KR); In Yong Seo, Seoul (KR); Kyoung Taek Park, Goyang-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 252 days.

(21) Appl. No.: 15/778,702

(22) PCT Filed: Nov. 17, 2016

(86) PCT No.: PCT/KR2016/013252
§ 371 (c)(1),
(2) Date: May 24, 2018

(87) PCT Pub. No.: WO2017/090935
PCT Pub. Date: Jun. 1, 2017

(65) Prior Publication Data
US 2018/0347427 A1 Dec. 6, 2018

(30) Foreign Application Priority Data
Nov. 24, 2015 (KR) .................. 10-2015-0164629

(51) Int. Cl.
*B01D 53/22* (2006.01)
*F01N 3/20* (2006.01)
(Continued)

(52) U.S. Cl.
CPC ............ *F01N 3/208* (2013.01); *B01D 29/111* (2013.01); *B01D 39/1623* (2013.01);
(Continued)

(58) Field of Classification Search
CPC .......... F01N 3/2066; F01N 2610/1413; F01N 2610/1466; F01N 3/208; F01N 2610/1426;
(Continued)

(56) References Cited

U.S. PATENT DOCUMENTS

| | | | |
|---|---|---|---|
| 6,024,148 A * | 2/2000 | Saitoh ............... | B65H 19/102 156/238 |
| 2004/0188029 A1* | 9/2004 | Kushihashi ......... | A24C 5/005 156/502 |

(Continued)

FOREIGN PATENT DOCUMENTS

| JP | 2010260425 | 11/2010 |
|---|---|---|
| KR | 100993943 | 11/2010 |

(Continued)

OTHER PUBLICATIONS

Jong-Cheol Park Machine translation of KR2011046907MT, 10 pgs (Year: 2011).*

(Continued)

*Primary Examiner* — Anthony R Shumate
(74) *Attorney, Agent, or Firm* — Cantor Colburn LLP

(57) ABSTRACT

Provided is a nanofiber vent device for a urea water tank including a filter unit for discharging gas generated in the tank main body and preventing external dust, foreign matter, and moisture from flowing into the tank main body, as a vent device that is installed in a tank main body storing urea water and discharging gas inside the tank main body to the outside.

7 Claims, 4 Drawing Sheets

(51) Int. Cl.
  *B01D 29/11* (2006.01)
  *B01D 39/16* (2006.01)
  *F01N 3/28* (2006.01)
  *B01D 46/54* (2006.01)
  *D01D 5/00* (2006.01)
  *D04H 1/728* (2012.01)

(52) U.S. Cl.
  CPC ......... *F01N 3/2066* (2013.01); *F01N 3/2896* (2013.01); *B01D 46/546* (2013.01); *B01D 2239/025* (2013.01); *B01D 2239/0421* (2013.01); *B01D 2239/0631* (2013.01); *B01D 2239/0654* (2013.01); *B01D 2239/1216* (2013.01); *B01D 2279/35* (2013.01); *D01D 5/0084* (2013.01); *D04H 1/728* (2013.01); *F01N 2610/02* (2013.01); *F01N 2610/1413* (2013.01); *F01N 2610/1426* (2013.01); *F01N 2610/1466* (2013.01)

(58) Field of Classification Search
  CPC .... F01N 3/2896; D01D 5/0084; D04H 1/728; B01D 2239/1216; B01D 2239/0421; B01D 2279/35; B01D 39/1623; B01D 2239/0654; B01D 2239/0631; B01D 29/111; B01D 46/546; B01D 2239/025
  See application file for complete search history.

(56) References Cited

U.S. PATENT DOCUMENTS

2013/0087042 A1* 4/2013 Furuyama .......... B01D 46/0023
                                                          95/47
2014/0260146 A1* 9/2014 Dudr .................... B01D 29/111
                                                          55/529
2015/0144548 A1* 5/2015 Holzwarth ....... B60K 15/03504
                                                          210/323.1

FOREIGN PATENT DOCUMENTS

| KR | 20110046907 | 5/2011 |
| KR | 101205232 | 11/2012 |
| KR | 101400280 | 5/2014 |
| KR | 101519424 | 5/2015 |

OTHER PUBLICATIONS

Jeong-Hui Park Machine translation of KRB993943MT, 28 pgs (Year: 2010).*
Jae-Yeong Lee Machine translation of KRB1400280MT, 20 pgs (Year: 2014).*
Min-Hyeon Jeong Machine translation of KRB1519424MT, 15 pgs (Year: 2015).*
International Search Report—PCT/KR2016/013252 dated Feb. 24, 2017.

* cited by examiner

NANOFIBER VENT DEVICE FOR UREA WATER TANK AND METHOD FOR MANUFACTURING SAME

TECHNICAL FIELD

The present invention relates to a nanofiber vent device for a urea water tank, which is installed in a urea water tank and is capable of quickly discharging gas generated in the urea water tank while preventing contaminants such as dust and foreign substances from entering the urea water tank, and a manufacturing method thereof.

BACKGROUND ART

In general, an exhaust system for a diesel engine includes an exhaust gas aftertreatment device such as a Diesel Oxidation Catalyst (DOC), a Diesel Particulate matter Filter (DPF), a Selective Catalyst Reduction (SCR) device, and a Lean NOx Trap (LNT), for reducing carbon monoxide (CO), hydrocarbon (HC), particulate matter, nitrogen oxide (NOx), and the like.

An exhaust gas aftertreatment system employing a selective catalytic reduction (hereinafter referred to as 'SCR') device in exhaust gas aftertreatment systems for a diesel engine sprays a reduction agent such as a urea water solution into an exhaust pipe, thereby reducing nitrogen oxide in an exhaust gas into nitrogen and water. That is, when the reducing agent is sprayed into the exhaust pipe, the SCR device converts the reducing agent into ammonia ($NH_3$) by the heat of the exhaust gas. Nitrogen oxide may be reduced to nitrogen gas ($N_2$) and water ($H_2O$) harmless to human and environment through a catalytic reaction of nitrogen oxide in the exhaust gas and ammonia with a SCR catalyst.

In this way, vehicles (such as trucks, buses, passenger cars, motorcycles, etc.) and ships, construction machines, and agricultural machinery with SCR devices are essentially equipped with urea water tanks.

The urea water tank needs a urea water solution supply system for spraying the urea water solution into the inside of the exhaust pipe and supplying it to the SCR device. However, the major component of the urea water is composed of urea and water, and the freezing point changes very much depending on the temperature. Since the freezing point is the lowest at −11.5° C. when the urea concentration is 32.5%, the urea water concentration is set at 32.5% for sale. Therefore, in the case of vehicles operating in cold conditions in winter, a heating device, and various sensors such as temperature and level may be attached to the urea water tank to prevent freezing of the urea water tank, and antifreeze or other additives may be added to prevent freezing.

In this case, since gas or the like is generated in the urea water tank, there is a possibility that a volume change occurs, so it is necessary to always maintain the pressure balance of the urea water tank.

As disclosed in Korean Patent Registration Publication No. 10-1205232 (on Nov. 27, 2012), a conventional urea water tank is provided with a tank housing in which urea water is stored, a sensor module which measures the water level, concentration and temperature of the urea water stored in the tank housing, and supplies the urea water to a urea water spraying device, and air vent portions which installed on both sides of an upper portion of the tank housing and discharges the gas inside the tank housing to the outside.

However, since the air vent portion of the conventional urea water tank is in the form of a pipe and vertically installed on the upper side of the tank housing, pollutants such as external dust and foreign substances and moisture are introduced into the urea water tank through the air vent portion, to thereby cause a problem of polluting the urea water stored in the tank housing.

DISCLOSURE

Technical Problem

Accordingly, an object of the present invention is to provide a nanofiber vent device for a urea water tank, in which a nanofiber web-type filter unit manufactured by an electrospinning method is installed in the vent device, so that, since the gas inside the urea water tank is discharged to the outside, pollutants such as external dust and foreign substances and the water can be prevented from flowing into the urea water tank, and a method of manufacturing the same.

Technical Solution

A nanofiber vent device for a urea water tank according to an aspect of the present invention includes a filter unit for discharging gas generated in the tank main body and preventing external dust, foreign matter, and moisture from flowing into the tank main body, as a vent device that is installed in a tank main body storing urea water and discharging gas inside the tank main body to the outside.

The vent device may include a vent housing which is hermetically mounted in an opening formed in an upper surface of the tank main body and in which a filter unit is installed in a passage through which the gas passes, and a vent pipe connected to one side of the vent housing.

The filter unit may include a filter member formed of a porous nanofiber web having a plurality of pores, by producing nanofibers by electrospinning a polymer material and then by accumulating the nanofibers.

The diameters of the nanofibers may range from 0.1 μm to 1.5 μm, and the average pore sizes thereof may be formed as 1 μm or less.

The surfaces of the filter member may be subjected to an oil-repellent refining treatment or a water-repellent coating treatment.

The filter unit may include a filter member formed of a porous nanofiber web having a plurality of pores by electrospinning a polymer material, and a porous substrate laminated on one or both surfaces of the filter member to support the filter member.

The porous substrate may be formed of any one of a nonwoven fabric, a woven fabric, a fabric, a paper, and a mesh.

The filter unit may include a porous substrate, a first filter member laminated on one surface of the porous substrate and formed of a nanofiber web having a plurality of pores by electrospinning a polymer material, and a second filter member laminated on the other surface of the porous substrate, and formed of a nanofiber web having a plurality of pores by electrospinning a polymer material.

The filter unit may include a porous substrate, a filter member formed on one surface of the porous substrate and formed of a porous nanofiber web having a plurality of pores by electrospinning a polymer material, and an adhesive layer laminated on an edge of the porous substrate or the filter member.

The adhesive layer may be formed as a nanofiber web by electrospinning a spinning solution in which a double-sided adhesive tape or an adhesive material and a polymer material are mixed.

A method of manufacturing a nanofiber vent device for a urea water tank according to another aspect of the present invention includes: preparing a porous nanofiber web-shaped filter member having a plurality of pores by electrospinning a polymer material; performing an oil-repellent refining treatment or a water-repellent coating treatment to the filter member; and cutting the filter member into the same size as an inner surface size of a vent housing of the vent device.

The method may further include attaching the porous substrate to one or both surfaces of the filter member.

The method may further include laminating an adhesive layer on the filter member.

The laminating the adhesive layer may be formed into a nanofiber web shape by electrospinning a spinning solution containing a mixture of an adhesive material and a polymer material or formed by laminating a double-sided adhesive tape.

Advantageous Effects

As described above, the nanofiber vent device for a urea water tank according to one or more embodiments of the present invention, is provided with the nanofiber web-type filter unit manufactured by the electrospinning method and installed in the vent device, to thereby rapidly discharge the gas inside the urea water tank and prevent contaminants such as external dust and foreign matter and water from entering into the urea water tank.

BEST MODE

Figure 1:
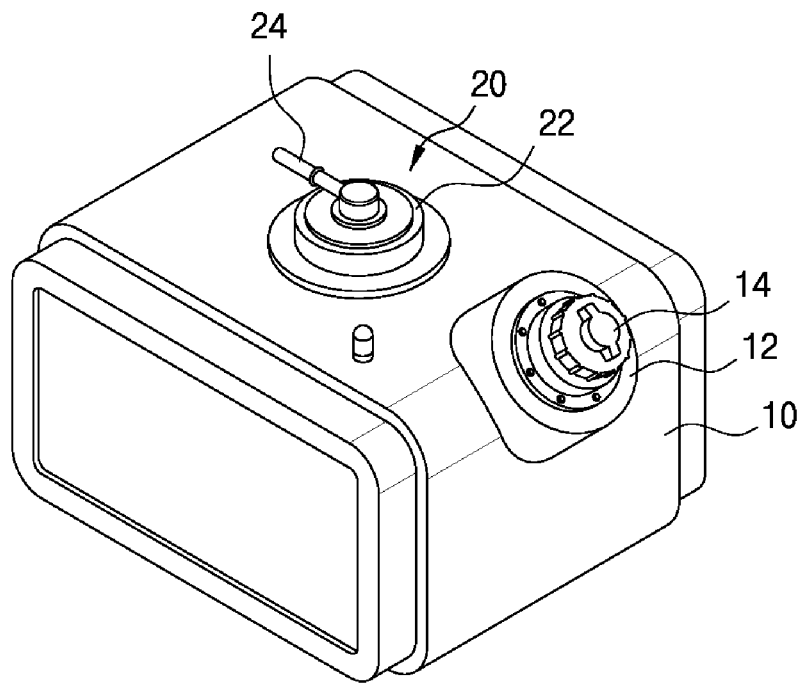
FIG. 1 is a perspective view of a urea water tank according to an embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

As shown in FIG. 1, the urea water tank according to an embodiment of the present invention includes: a tank main body 10 having a space for storing urea water therein; an inlet portion 12 formed at one side of an upper surface of the tank main body 10 and opened and closed by a stopper 14; a sensor module installed in the tank main body 10 for measuring the level, the temperature, the concentration, or the like of the urea water; and a vent device 20 installed in the upper surface of the tank main body 10 for discharging gas inside the tank main body 10 to the outside.

The sensor module may include a heat pipe for thawing the urea water frozen in the winter season, a water level sensor for measuring the level of the urea water, a quality sensor for measuring the concentration and temperature of the urea water, and the like.

A drain device for discharging the urea water stored in the tank main body 10 to the outside may be provided on the lower side of the tank main body 10.

Figure 2:
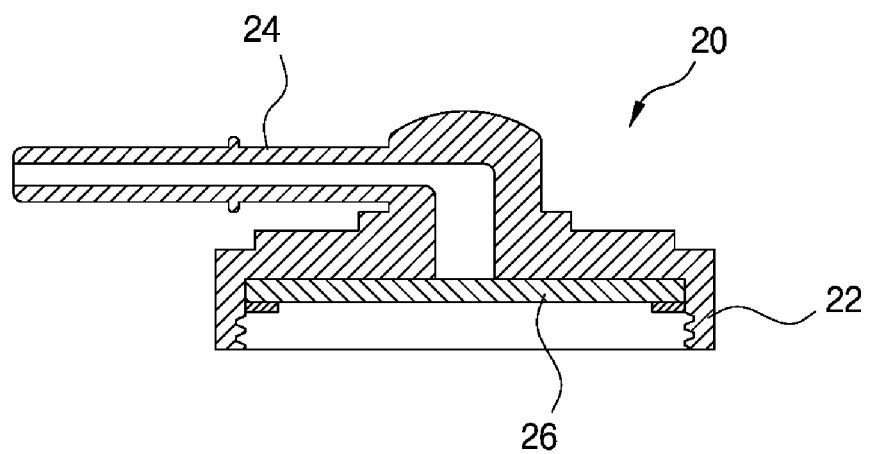
FIG. 2 is a cross-sectional view of a vent device unit according to an embodiment of the present invention.

As shown in FIG. 2, the vent device 20 includes: a vent housing 22 which is sealably mounted on an opening formed on the upper surface of the tank main body 10; a vent pipe 24 which is provided in communication with one side of the vent housing 22; and a filter unit 26 mounted in the vent housing 22 for discharging gas generated in the tank main body 20 to the outside and preventing contaminants such as external dust and foreign substances and moisture from being introduced into the tank main body 10.

The filter unit 26 is fixed on an inner surface of the vent housing 22 by an adhesive or the like, and is provided on a passage through which the gas passes.

Figure 3:
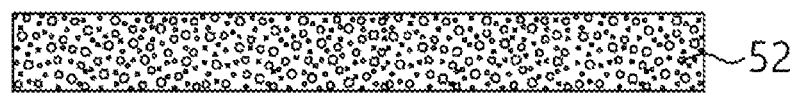
FIG. 3 is a cross-sectional view of a filter unit according to a first embodiment of the present invention.
Figure 4:
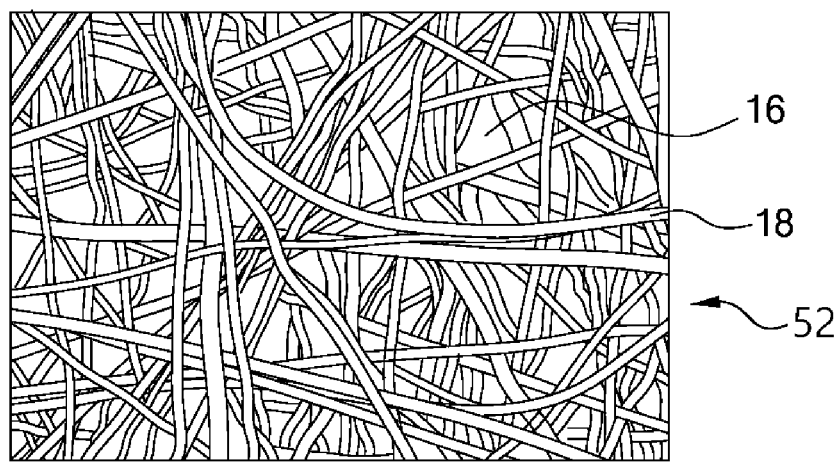
FIG. 4 is a partially enlarged view of the filter unit according to the first embodiment of the present invention.

The filter unit 26 according to the first embodiment includes a filter member 52 formed of a porous nanofiber web having a plurality of pores 16 formed by electrospinning, as shown in FIGS. 3 and 4.

The filter member 52 is formed into a nanofiber web shape having a plurality of pores 16 by accumulating nanofibers 18 formed by electrospinning a polymer material.

The polymeric material used in some embodiments of the present invention may employ, for example, synthetic and natural polymers which can be electrospun. One or more of these polymers may be used in combination.

Particularly preferred as the filter member material used in some embodiments of the present invention among the polymer materials are polyacrylonitrile (PAN), polyvinylidene fluoride (PVdF), polyester sulfone (PES), polystyrene (PS), polyvinyl chloride (PVC), and poly carbonate (PC), alone, or a mixture of polyvinylidene fluoride (PVdF) and polyacrylonitrile (PAN), a mixture of PVdF and PES, a mixture of PVdF and thermoplastic polyurethane (TPU), PVC, PC and the like.

As a spinning method to be applied to some embodiments of the present invention, there may be used a nozzle mounted upstream type, a nozzle mounted downstream type, or a nozzleless type which can spin without any nozzle, or there may be used any one of electrospinning, centrifugal electrospinning, air electrospinning, flash electrospinning, pulsed electrospinning and bubble electrospinning.

Since the filter member 52 is manufactured by the electrospinning method, the thickness of the filter member 52 is determined according to the amount of the spun polymer material. Accordingly, there is an advantage that it is easy to make the thickness of the porous nanofiber web to a desired thickness. That is, when the amount of the spun polymer material is made reduced, the thickness of the porous nanofiber web may be made thinner, and when the amount of the spun polymer material is reduced, manufacturing costs are reduced.

Here, the number of pores and the average diameter of the pores in the filter member 52 are determined according to the thickness of the filter member 52, so that the filter member 52 includes the nanofibers having diameters and average pore size through which the gas generated in the tank main body 10 can pass, while preventing external dust, foreign matter, and moisture from passing therethrough.

The diameters of the nanofibers 18 to satisfy such a condition are in the range of 0.1 µm to 1.5 µm, and the average size of the pores 16 is preferably 1 µm or less.

As described above, the filter member 52 in some embodiments of the present invention can employ the pore size in various sizes by using the porous nanofiber web, so that it is convenient to fabricate the diameters and the average pore size of the nanofibers through which the gas pass but through which dust, foreign matter, and moisture can be prevented from passing, and thus the filter member 52 is suitable for the bent device installed in the urea water tank.

In addition, the filter member 52 according to the first embodiment can further improve waterproof and oil-repellent performance by subjecting the surface of the filter member 52 to oil-repellent refining treatment or water-repellent coating treatment, and improve an anti-fouling ability to prevent the passage of various contaminants other than water.

The oil-repellent refining process may be performed by treating the surface of the porous nanofiber web with an oil-repellent agent, and the water-repellent coating process may be performed by oleophobic treatment.

Figure 5:
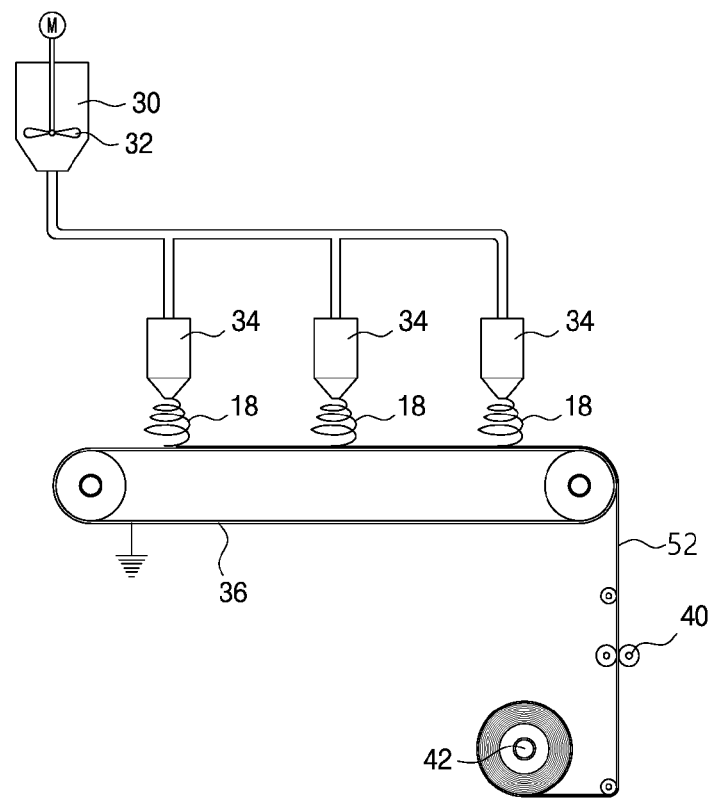
FIG. 5 is a configuration diagram of an electrospinning device according to the first embodiment of the present invention.

As shown in FIG. 5, the electrospinning apparatus applied in some embodiments of the present invention includes a storage tank 30 in which a polymer solution is stored, a spinning pack 30 connected to a high voltage generator and connected to the storage tank 30, to spin nanofibers, and a collector 36 in which the nanofibers spun from the spin pack 34 are accumulated to produce a porous nanofiber web.

The storage tank 30 is provided with an agitator 32 for maintaining a certain viscosity of the spinning solution.

A high voltage of 90 Kv to 120 Kv is applied between the collector 36 and the spinning pack 34 and the nanofibers 18 are spun from the spinning pack 34 to form the porous nanofiber web 10 on the collector 36.

A pressure roller 40 and a nanofiber web roll 42 are provided at the rear of the collector 36. The pressure roller 40 presses the porous nanofiber web produced by the electrospinning method to a predetermined thickness, and the porous nanofiber web pressed while passing through the pressure roller 40 is wound on the nanofiber web roll 42.

The process of manufacturing the filter member 52 using the electrospinning apparatus configured as described above will be described as follows. By applying a high voltage between the collector 36 and the spinning pack 34, the polymer material is made into nanofibers in the spinning pack 34, and the nanofibers are emitted to the collector 36. Then, the nanofibers are accumulated on the upper surface of the collector 36 to form a nanofiber web type filter member 52 having a plurality of pores.

The filter member 52 is made to have a certain thickness while passing through the pressure roller 40 and is wound around the nanofiber web roll 42.

Further, the surface of the filter member 52 is subjected to oil-repellent refining treatment or water-repellent coating treatment to improve the waterproofing and oil-repellent performance.

The filter member 52 is made to have the same shape and size as the inner surface of the vent housing 22 by blanking the filter member 52 and is completed when an adhesive tape is attached to the edge of the filter member 52.

Figure 6:
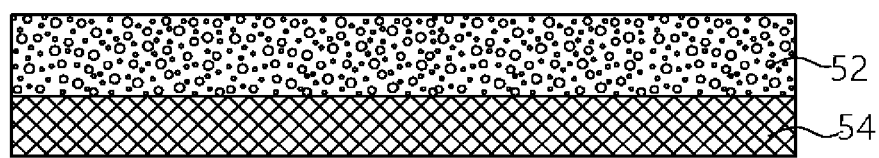
FIG. 6 is a cross-sectional view of a filter unit according to a second embodiment of the present invention.

As shown in FIG. 6, the filter unit 26 according to a second embodiment includes a filter member 52 and a porous substrate 54 having a plurality of pores stacked on one surface of the filter member 52.

The filter member 52 has the same configuration as the filter member 52 described in the first embodiment above.

The porous substrate 54 may employ a thermal bond nonwoven fabric, a spunbond nonwoven fabric, a chemical bond nonwoven fabric, an airlaid nonwoven fabric, or a mixture thereof. In addition to the nonwoven fabric, the porous substrate may be formed of a woven fabric, a fabric having pores, paper, a mesh, or the like.

As described above, the filter unit 26 according to the second embodiment has a structure in which the porous base material 54 is laminated on one surface of the filter member 52 to improve the handling characteristics of the filter unit 26, and reinforce the strength of the filter unit 26.

Figure 7:
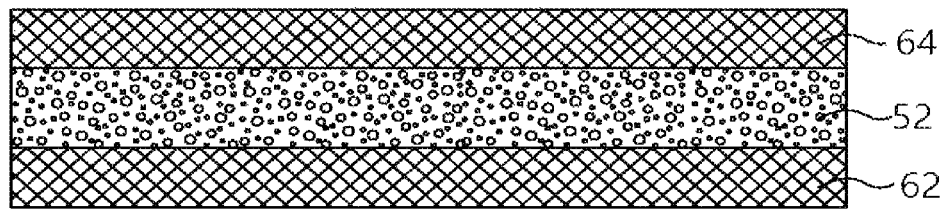
FIG. 7 is a cross-sectional view of a filter unit according to a third embodiment of the present invention.

As shown in FIG. 7, the filter unit 26 according to a third embodiment has a structure in which a first porous substrate 62 is laminated on one surface of the filter member 52 and a second porous substrate 64 is formed on the other surface of the filter member 52.

Figure 8:
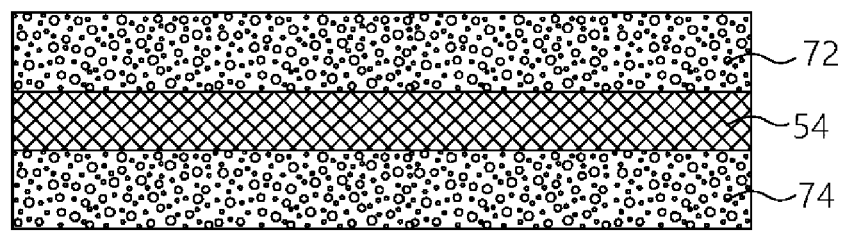
FIG. 8 is a cross-sectional view of a filter unit according to a fourth embodiment of the present invention.

As shown in FIG. 8, the filter unit according to a fourth embodiment includes a porous substrate 54 having a plurality of pores, a first filter member 72 formed of a nanofiber web having a plurality of pores which is stacked on one surface of the porous substrate 54 and is formed by electrospinning a polymer material, and a second filter member 74 laminated on the other surface of the porous substrate 54 and formed of a nanofiber web having a plurality of pores by electrospinning a polymer material.

Figure 9:
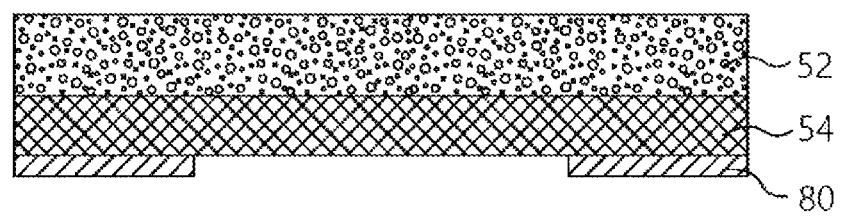
FIG. 9 is a cross-sectional view of a filter unit according to a fifth embodiment of the present invention.

As shown in FIG. 9, the filter unit according to a fifth embodiment includes a porous substrate 54 having a plurality of pores, a filter member 52 formed on one surface of the porous substrate 54 and formed of a porous nanofiber web having a plurality of pores by electrospinning a polymer material, and an adhesive layer 80 laminated on the porous substrate 54 or the filter member 52.

The adhesive layer 80 is formed on the edge of the filter member 52 or the porous substrate 54 to bond the filter unit 26 to the inner surface of the vent housing 22 and to fix the filter unit 26 to the vent housing 22.

The adhesive layer 80 may be thermally bonded by heat or bonded by a double-sided adhesive tape, and may be formed by an electrospinning method.

In the case of forming the adhesive layer by using the electrospinning method, the adhesive layer 80 is formed into a nanofiber web by making nanofibers by electrospinning a spinning solution in which an adhesive material and a polymer material are mixed, and accumulating the nanofibers.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is installed in a urea water tank for an exhaust gas aftertreatment system for a diesel engine provided in a vehicle (a truck, a bus, a passenger car, a motorcycle, etc.), a ship, a construction machine and an agricultural machine, to thereby prevent contaminants such as external dust and foreign substances and moisture from entering into the inside of the urea water tank.

What is claimed is:

1. A nanofiber vent device for discharging gas generated in a urea water tank, the nanofiber vent device comprising:
    a vent housing installed in a tank main body of a urea water tank; and
    a filter unit installed inside the vent housing and preventing external dust, foreign matter, and moisture from flowing into the tank main body,
    wherein the filter unit comprises: a porous substrate; a filter member laminated on one surface of the porous substrate; and an adhesive layer laminated on an edge of the porous substrate or the filter member,
    wherein the filter member is formed of a porous nanofiber web having a plurality of pores, the porous nanofiber web being formed of first accumulated electro-spun nanofibers, the first accumulated electro-spun nanofibers being formed of a polymer material, and
    wherein the adhesive layer is formed of a nanofiber web, the nanofiber web being formed of second accumulated electro-spun nanofibers, the second accumulated electro-spun nanofibers being formed of a mixture of a polymer material and an adhesive material.

2. The nanofiber vent device of claim 1, wherein the vent housing is mounted in an opening formed in an upper surface of the tank main body, a vent pipe is connected to one side of the vent housing, and in which the filter unit is installed in a gas passage of the vent housing.

3. The nanofiber vent device of claim 1, wherein the first accumulated electro-spun nanofibers have a diameter in a range from 0.1 µm to 1.5 µm, and the pores have an average size of 1 µm or less.

4. The nanofiber vent device of claim 1, wherein the filter member include an oil-repellent treated filter member or a water-repellent treated filter member.

5. The nanofiber vent device of claim 1, wherein the porous substrate is formed of any one of a nonwoven fabric, a woven fabric, a fabric, a paper, and a mesh.

6. The nanofiber vent device of claim 1, wherein the filter member includes: a first filter member laminated on the one surface of the porous substrate; and a second filter member laminated on the other surface of the porous substrate.

7. A method of manufacturing a nanofiber vent device for a urea water tank, the method comprising:
    electrospinning a polymer material to form a porous nanofiber web-shaped filter member having a plurality of pores;
    oil-repellent treating or water-repellent treating a surface of the porous nanofiber web-shaped filter member to form an oil-repellent treated filter member or a water-repellent treated filter member;
    attaching a porous substrate to one or both surfaces of the oil-repellent treated filter member or the water-repellent treated filter member; and
    laminating an adhesive layer on an edge of the porous substrate,
    wherein the laminating includes: preparing an electrospinning solution containing a mixture of an adhesive material and a polymer material; electrospinning the spinning solution on the porous substrate to form a nanofiber web-shaped adhesive layer.

* * * * *